Oct. 17, 1967 C. W. CLARK, JR Re. 26,288

MIX-AND-AIR FEEDING DEVICE FOR DISPENSING FREEZERS

Original Filed Dec. 13, 1963

CHARLES W. CLARK JR.
INVENTOR.

BY Seed & Berry

ATTORNEYS

United States Patent Office

Re. 26,288

Reissued Oct. 17, 1967

26,288

MIX-AND-AIR FEEDING DEVICE FOR DISPENSING FREEZERS

Charles W. Clark, Jr., Seattle, Wash., assignor to Sweden Freezer Manufacturing Co., Seattle, Wash., a corporation of Washington Original No. 3,258,030, dated June 28, 1966, Ser. No. 330,326, Dec. 13, 1963. Application for reissue Oct. 10, 1966, Ser. No. 597,178

12 Claims. (Cl. 137—589)

Matter enclosed in heavy brackets [ ] appears in the original patent but forms no part of this reissue specification; matter printed in italics indicates the additions made by reissue.

This invention relates to devices for feeding mix and air to freezers which operate to produce and dispense frozen mix-and-air products, such, for example, as "soft" ice cream.

More particularly, the invention relates to mix-and-air feeding devices of the type shown in U.S. Patent No. 2,924,951, and aims to provide an improved such device which is readily adjustable to vary the relative proportions of mix and air fed to the freezing cylinder.

Other more particular objects and advantages of the invention, will, with the foregoing, appear and be understood in the course of the following description and claims, the invention consisting in the novel construction and in the adaptation and combination of parts hereinafter described and claimed.

Figure 1:
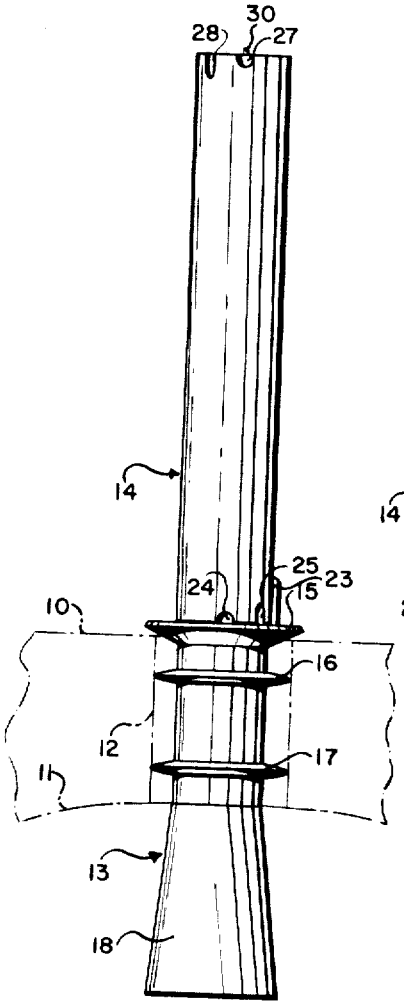
Figure 2:
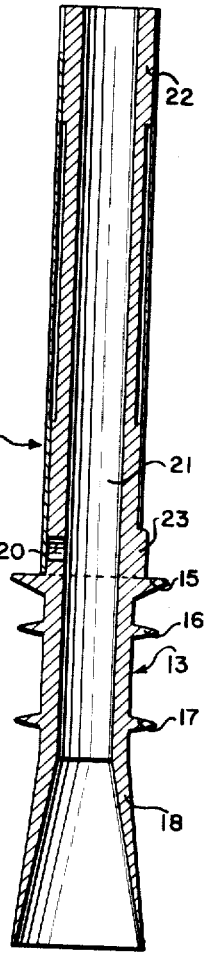
Figure 3:
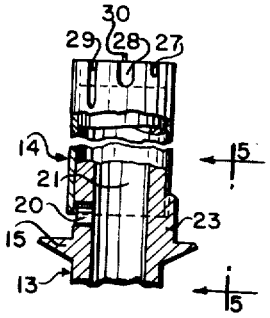
Figure 4:
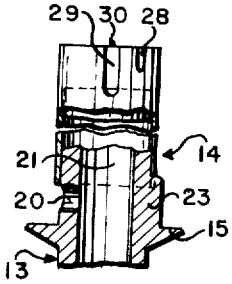
Figure 5:
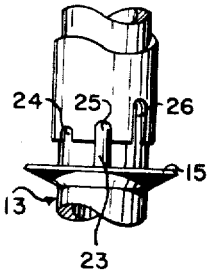

In the accompanying drawing:

FIG. 1 is an elevational view of the mix and air feeding device embodying the present invention, FIG. 2 is a longitudinal vertical sectional view of the device as adjusted in FIG. 1, FIGS. 3 and 4 are fragmentary elevational views, partly in vertical section, illustrating the two other adjustments of the sleeve; and FIG. 5 is a fragmentary elevational view taken as indicated by line 5—5 of FIG. 3.

Referring to FIG. 1, the phantom lines 10, 11 and 12 indicate the floor of the mix tank, inside wall of the freezing cylinder, and interconnecting feed tube, respectively, of a dispensing freezer with which the present invention is to be employed. A suitable such freezer is shown in Patent No. 2,924,951, and is of the type in which the freezing cylinder has a motor-driven dasher therein with an auger front for urging frozen product through a gate-controlled discharge opening at the forward end of the cylinder.

The feeding device of the present invention comprises a molded plastic tube 13 and a matching sleeve 14, the latter preferably being fabricated of stainless steel or aluminum. Molded integrally with the tube 13 is a central stopper flange 15 tapered on its underside, and a pair of axially spaced sealing flanges 16–17. Beneath the latter the tube 13 flares outwardly to provdie a beveled outlet portion 18 which has as a maximum diameter the inside diameter of the feed tube 12.

Closely above the stopper flange 15 there is provided an orifice or port 20 for connecting the center longitudinal through-bore 21 of the tube 13 with the interior of the mix tank 10. This port is purposely smaller in cross-sectional area than the bore 21 so as to limit the flow of mix from the tank relative to the downward flow of air in the upwardly extending stem portion 22 which projects above the level of the mix in the tank.

Diametrically opposite the port 20 in the tube 13 there is formed a longitudinally extending rib-like land or ridge 23 which merges at its lower end with the flat upper face of the stopper flange 15 and extends above the level of the port 20. For selectively interfitting with this land 23 the lower end of the sleeve 14 is formed with three downwardly opening positioning slots 24, 25 and 26, which are of progressively increasing length and are spaced apart an eighth of a turn of the sleeve. The longest slot 26 is as long as the land 23 so that when it is interfitted with the latter the base of the tube 14 rests on the top of the stopper flange 15. In this position, shown in FIGURES 1 and 2, the port 20 is completely closed. As illustrated in FIGURES 3 and 5, when the sleeve 14 is adjusted to bring the intermediate slot 25 into registration with the land 23, the port 20 is half open, and when further adjusted to interfit the shortest slot 24 with the land (FIG. 4), the port is fully open.

At its upper end the sleeve 14 is formed with three indicator slots 27, 28 and 29, which match in depth the bottom slots 24, 25 and 26, respectively. Slot 27 directly overlies the slot 24 whereas the other two upper slots 28–29 progress clockwise therefrom rather than in the counter-clockwise direction as in the case of the bottom corresponding slots 25–26. Midway between the port 20 and land 23, circumferentially speaking, the upper end face of the tube 13 is formed with a nib 30 serving as a pointer. With this arrangement the nib 30 is alined with the shallowest slot 27 when the port is closed, with the central slot 28 when the port is half open, and with the longest slot 29 when the port is fully open. In this manner the operator is advised as to the status of the port 20.

The sealing flanges 16–17 are feathered at their outer edge to be flexible and they have an outside diameter less than that of the stopper flange 15, but slightly greater than the inside diameter of the feed tube 12 with which the device is to be used. With this arrangement the sealing flanges 16–17 deflect upwardly as the tube 13 is pushed downwardly during introduction of the lower end portion 18 thereof to the feed tube, and hence seal against the feed tube's inside wall. In addition the tube 13 is pushed downwardly until the stopper flange 15 is firmly seated against the upper rim of the feed tube. Then, with the sleeve 14 turned to the closed postion (FIGS. 1–2), the mix tank 10 is ready to be filled with mix. When the freezing cylinder is to be charged the sleeve is lifted and turned counterclockwise to register slot 25 or 24 with the land 23 depending upon the desired mix to air ratio. After the freezing cylinder is initially charged, the device operates in the manner described in Patent No. 2,924,951 to automatically replenish the freezing cylinder responsive to dispensing of the frozen product therefrom.

It is believed that the invention will have been clearly understood from the foregoing detailed description of my now-preferred illustrated embodiments. Changes in the details of construction may be resorted to without departing from the spirit of the invention and it is accordingly my intention that no limitations be implied and that the hereto annexed claims be given the broadest interpretation to which the employed language fairly admits.

I claim:

1. In a mix-and-air feeding device for introduction to a tubular connection between the mix tank and freezing chamber of a dispensing freezer, an open-ended tube having an annular stopper flange intermediate its ends for seating on the upper rim of said connection, a mix port therethrough located closely above said stopper flange [and having an area smaller than the minimum interim cross-sectional area of the tube], and a land surmounting said stopper flange and circumferentially spaced from said port; and an adjusting sleeve on said tube having a plurality of circumferentially spaced slots of different depths open to the lower end of the sleeve and arranged to be selectively fitted over said land to respectively raise said sleeve above said stopper flange to expose selected amounts of the area of said mix port beneath the lower end of the sleeve.

2. The device of claim 1 in which said land extends from said stopper flange to a level above the level of the upper edge of said mix port.

3. The device of claim 1 in which said tube has a flexible annular sealing flange of less outer diameter than said stopper flange and spaced beneath the stopper flange.

4. The device of claim 1 in which said land is diametrically opposite said mix port and in which said slots collectively encompass less than a half turn.

5. The device of claim 1 in which one of said slots is longer than the difference in levels between the top of said land and the bottom of said mix port, and in which another of said slots is no longer than the difference in levels between the top of said land and the top of said mix port.

6. The device of claim 1 in which said tube has an indicator at the top and in which said sleeve has slots at the top corresponding to its slots at the bottom.

7. The device of claim 6 in which said top slots in the sleeve are in reverse order to the bottom slots therein.

8. In a mix-and-air feeding device for introduction to a tubular connection between the mix tank and freezing chamber of a dispensing freezer, an open-ended tube having an annular stopper flange intermediate its ends for seating on the upper rim of said connection, a mix port therethrough located closely above said stopper flange and having an area smaller than the minimum interior cross-sectional area of the tube, and a land surmounting said stopper flange extending above the level of the top of said mix port in circumferentially spaced relation thereto; and an adjusting sleeve on said tube having a bottom slot open to the lower end of the sleeve and extending upwardly a distance exceeding the differences in levels between the top of said land and the bottom of said mix port.

9. In a mix-and-air feeding device for introduction to a tubular connection between the mix tank and freezing chamber of a dispensing freezer, an open-ended tubular member having an annular stopper flange intermediate its ends for seating on the upper rim of said connection, a mix port therethrough located closely above said stopper flange and having an area smaller than the minimum interior cross-sectional area of the tubular member, an adjusting sleeve member on said tubular member, one of said members having a plurality of circumferentially spaced slots of different depth open to one end of such member and located above said stopper flange, the other of said members having a land which extends radially therefrom and is arranged to selectively interfit with said slots to respectively raise the lower end of said sleeve member relative to said mix port and thereby expose selected amounts of the area of the mix port beneath the lower end of the sleeve member.

10. The feeding device of claim 9 in which said sleeve member is also free to seat at its lower end against said stopper flange to thereby selectively completely close said mix port.

11. In a mix-and-air feeding device for introduction to a tubular connection between the mix tank and freezing chamber of a dispensing freezer, an open-ended tubular member having an annular stopper flange intermediate its ends for seating on the upper rim of said connection, a mix port therethrough located closely above said stopper flange and having an area smaller than the minimum interior cross-sectional area of the tubular member, an adjusting sleeve member on said tubular member, one of said members having a plurality of circumferentially spaced positioning means adjacent one end thereof located above said stopper flange and spaced at varying distances from said one end lengthwise of such member, the other said member having a land which extends radially therefrom and is arranged to selectively engage said positioning means to respectively raise the lower end of said sleeve member relative to said stopper flange and thereby expose selected amounts of the area of the mix port beneath the lower end of the sleeve member.

12. The feeding device of claim 11 in which said sleeve member is also free to seat at its lower end against said stopper flange to thereby selectively completely close said mix port.

References Cited

The following references, cited by the Examiner, are of record in the patented file of this patent or the original patent.

UNITED STATES PATENTS

| | | | |
|---|---|---|---|
| 1,054,533 | 2/1913 | Greiner | 137—577 |
| 1,086,663 | 2/1914 | Gould et al. | 137—577 |
| 1,321,513 | 11/1919 | Eaton | 137—577 |
| 3,068,889 | 12/1962 | Swenson | 62—304 |
| 3,141,583 | 7/1964 | Mapel et al. | 222—309 |
| 3,179,133 | 4/1965 | Cherry | 141—40 |

M. CARY NELSON, *Primary Examiner.*

W. CLINE, *Assistant Examiner.*